UNITED STATES PATENT OFFICE.

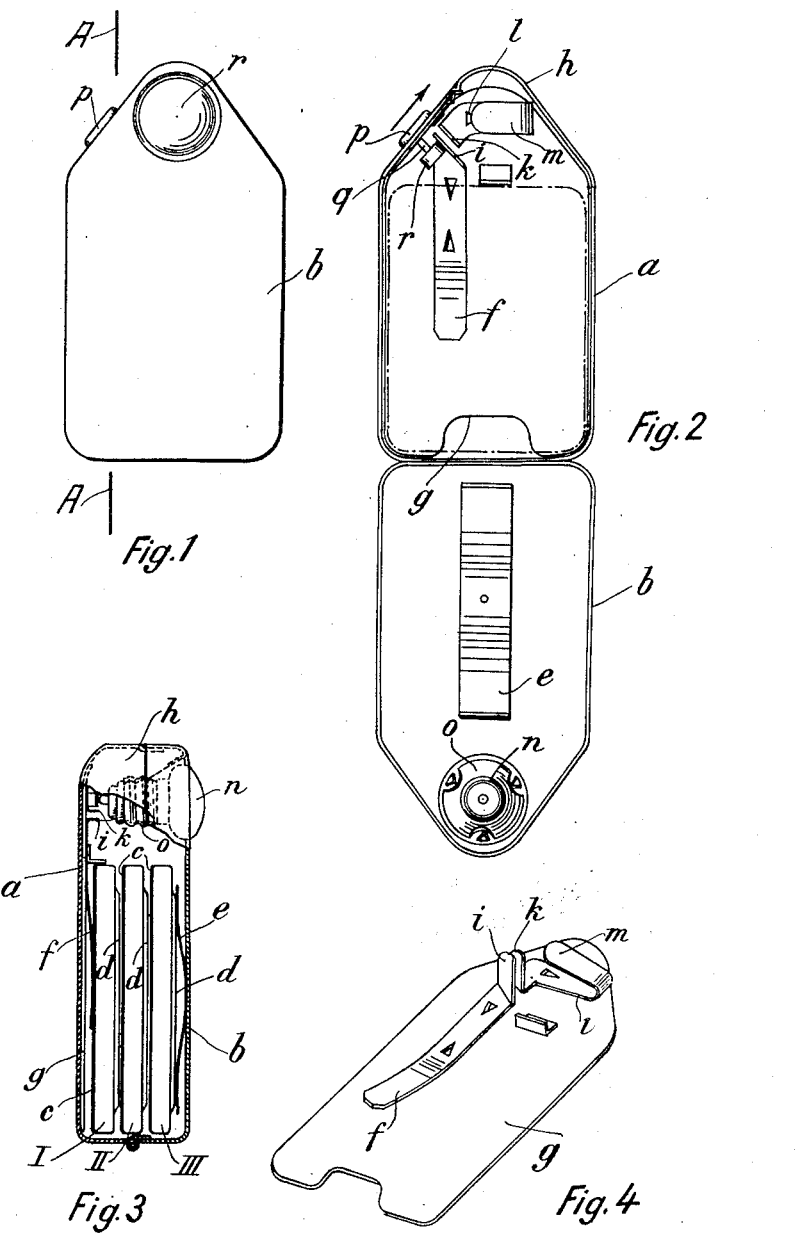

CONRAD BOLTSHAUSER, OF RORSCHACH, SWITZERLAND, ASSIGNOR TO COSMOPHOS-WERKE A.-G., OF RORSCHACH, SWITZERLAND.

ELECTRIC POCKET-LAMP.

1,365,636. Specification of Letters Patent. Patented Jan. 11, 1921.

Application filed July 6, 1920. Serial No. 394,096.

*To all whom it may concern:*

Be it known that I, CONRAD BOLTSHAUSER, a citizen of the Swiss Confederation, residing at Rorschach, Switzerland, have invented new and useful Improvements in Electric Pocket-Lamps, of which the following is a specification.

This invention relates to electric pocket-lamps and my object is to provide an improved switch or contact maker for same consisting in the arrangement of two adjacently placed angular contact plates and an independent switch member for bringing the said contact plates together.

I carry out my object in the following manner and by the means shown in the annexed drawings, in which:—

Figure 1 is a face view of the electric pocket-lamp; Fig. 2, a plan of the interior of same; Fig. 3, a longitudinal section on line A—A of Fig. 1; and Fig. 4, a perspective view of the switch with its insulating carrier plate.

The improved electric pocket-lamp consists of a divided metal casing $a$ and $b$ hinged together and having an oblong form with tapered or roof-shaped forward portion $h$. The tapered end of the cover $b$ contains a counter-sunk electric bulb $n$, while beneath the bulb $n$ in the tapered portion $h$ of the lower casing $a$ there is disposed a make and break contact for the electric current. The oblong portion of the divided casing contains the electric battery composed of three loosely superposed piles I, II, III each having a positive electrode $c$ and a negative electrode $d$. Electric conduction between the piles is insured by the contact with each other of the same with their opposite pole-electrodes. The positive electrode $c$ of pile I and the negative electrode $d$ of pile III form the outer contacts of the battery.

To the inside of the cover $b$ is fixed a blade spring $e$ which presses the piles I, II, III against each other and against a contact blade $f$ fast on an insulating plate $g$ placed on the floor of the casing $a$. The blade $f$ leads to the contact switch members provided in the tapered end portion $h$ of the casing.

The above described arrangement of electric pocket-lamp is known, and the novel feature consists in that the blade $f$ has an upturned angular arm $i$ facing a similarly upturned arm $k$ of an adjacent insulated contact blade $l$ fast on the insulating plate $g$. The blade $l$ has a turned-over end portion $m$ that presses against the inner pole of the bulb $n$. In the slotted side of the tapered end of the casing $a$ is mounted a sliding button $p$ which on its protruding pin $q$ within the casing carries a roller $r$ of insulating material.

By shifting the button $p$ in the direction of the arrow (Fig. 2) the roller $r$ will press the arm $i$ against the adjacent arm $k$ thereby closing the circuit. The electric current now flows from the positive pole of the battery through the switch into the bulb, then through the metallic screw-cap $o$ of the bulb, and through the metal casing to the negative pole of the battery. For the breaking of the circuit, the switch $p$ is moved rearward whereon the arm $i$ springs away from the arm $k$.

The contact arms $i$ and $k$ and shift-button $p$ form a simple reliable and lasting switch for the aforedescribed pocket-lamp.

I claim:

An electric pocket-lamp consisting of a divided metal casing of oblong form with tapered forward portion containing oblong piles forming battery and a counter-sunk electric bulb in the tapered portion, upright angular contact arms beneath the bulb, an insulating plate carrying the contact arms, an extension from one arm to the lower outer pole of the battery, a turned-over extension from the other contact arm to the inner pole of the bulb, and a shift-button in the slotted side of the tapered end of said casing, an upwardly projecting pin connected with said button, and an insulating roller on the inner end of the pin in contact with the extension contact arm from the lower face of the battery.

CONRAD BOLTSHAUSER.